Sept. 15, 1970      W. D. DRUMMOND      3,528,506
DUPLEX IMPLEMENT
Filed Jan. 2, 1968      2 Sheets-Sheet 1
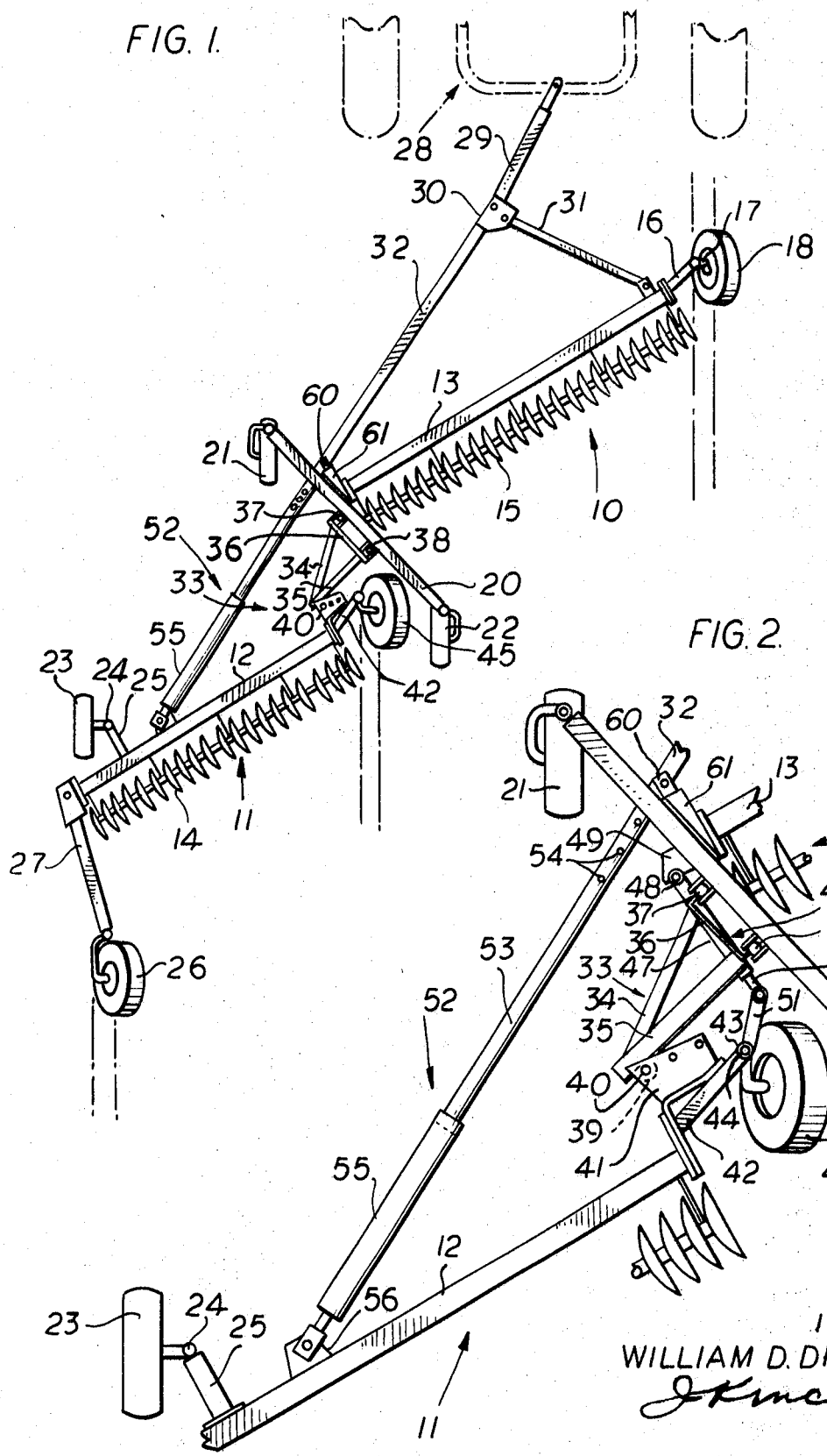
INVENTOR
WILLIAM D. DRUMMOND
ATTY

INVENTOR
WILLIAM D. DRUMMOND

ATT'Y 3,528,506
DUPLEX IMPLEMENT
William D. Drummond, Burlington, Ontario, Canada, assignor to International Harvester Company, Chicago, Ill., a corporation of Delaware
Filed Jan. 2, 1968, Ser. No. 694,952
Int. Cl. A01b 23/04
U.S. Cl. 172—314      5 Claims

ABSTRACT OF THE DISCLOSURE

A duplex disking implement comprises at least two disk plow or like units interconnected in offset relation for relative lateral and vertical movement, the forwardmost unit having a front furrow wheel and a transverse rear stabilizing wheeled truck. The rear unit has a rear furrow wheel and a forward furrow wheel which is located between the wheels of the wheeled truck, the last mentioned furrow wheel being adapted to absorb side draft in operation and to caster when the implement is turned.

---

This invention relates to agricultural implements and particularly to disk tillers. More specifically, the invention concerns a duplex disk tiller.

An object of the invention is the provision of a duplex disk tiller of improved construction and maneuverability.

Another object of the invention is the provision of a duplex disk tiller having improved stability and flexibility in operation and having means facilitating turning the implement in operation or transport.

Other objects and advantages of the invention will become clear from the following detailed description when read in conjunction with the accompanying drawings, wherein:

FIG. 1 is a diagrammatic plan view of a duplex disk tiller incorporating the features of this invention;

FIG. 2 is an enlarged diagrammatic plan view of a portion of the structure shown in FIG. 1, with the parts disposed in their normal operating relationship;

Figure 3:
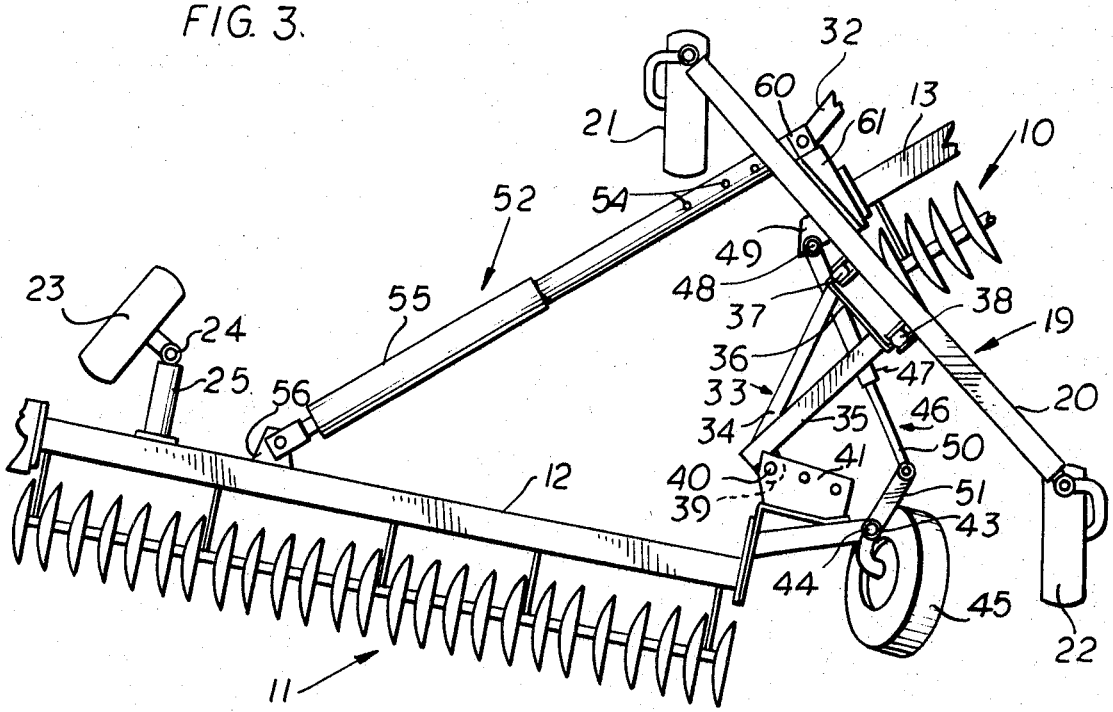
FIG. 3 is a diagrammatic plan view similar to FIG. 2 showing the relationship of parts when the implement is being turned.

To avoid overlarge and unwieldy disk tillers, it has become increasingly important to gang together two or more disk tiller units in order to effectively utilize the higher horsepower provided in modern tractors, and the drawings disclose two such tiller units 10 and 11. These units comprise elongated diagonally extending beams 12 and 13 upon which the disk gangs 14 and 15 are respectively mounted by means, not shown, accommodating vertical movement of the disk gangs between operating and transport positions.

The forward end of beam 13 has secured to it an extension 16 rotatably supporting a generally vertical spindle 17 upon which is mounted a front furrow wheel 18.

The implement is stabilized and the rear end of forward unit 10 is supported by a wheeled truck 19 comprising a beam 20 extending transversely of the direction of travel and affixed to the upper portion of a depending bracket 61 the lower portion of which is attached to the rear end of beam 13. The beam 20 carries and carrying at its casting wheels 21 and 22.

The rear unit 11 carries a land wheel 23 mounted by a vertical pivot 24 upon bracket 25 affixed to the rear portion of beam 12, and a rear furrow wheel 26 carried at the end of a bar 27 mounted on the rear end of beam 12.

Figure 4:
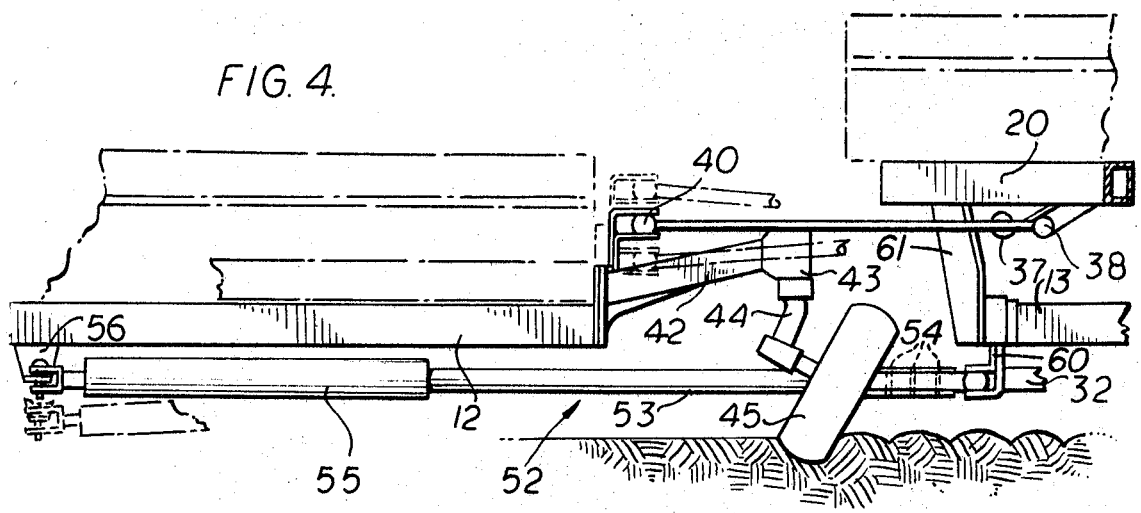
FIG. 4 is a diagrammatic view in side elevation of the structure shown in FIG. 2.

In the normal operation of the implement in a straight line, rear unit 11 is parallel and offset with respect to unit 10, as shown in FIG. 1, and is connected to a tractor 28 by a hitch bar 29, the rear end of which is pivotally connected to a plate 30 to which is also pivotally connected one end of a link 31, the other end of which is pivotally connected to the forward end of beam 13. Draft is transmitted to the rear portion of forward unit 10 by a draft bar 32 to the forward end of which is secured plate 30, and the rear end, as best shown in FIG. 4, of which is pivotally connected to a flange 60 attached to the bottom of a depending bracket 61 the upper portion of said bracket being affixed to the beam 20, and beam 13 the rear end of beam 13 is affixed, as by welding, to the lower portion of the depending bracket 61.

An articulated connection is made between the rear end of unit 10 and the forward end of unit 11 to hold the latter in its offset parallel relation to front unit 10 and to accommodate lateral as well as vertical swinging movement of one unit relative to the other, by triangularly shaped link means 33 comprising a pair of angled bars 34 and 35 connected by a base member 36 which is connected to truck beam 20 by pivots 37 and 38. The rear end of link means 33 has secured to it a lug 39 connected by a universal pivot 40 to a plate 41 affixed to an extension 42 at the front end of beam 12.

The forward end of extension 42 carries a bearing 43 in which is rotatably mounted a generally vertical spindle 44 carrying at its lower end a furrow wheel 45 adapted to engage the wall of the furrow formed by the forward gang 14 and to minimize side draft forces acting on the implement.

Wheel 45 is disposed between wheels 21 and 22 of the truck 19 of the forward unit, and in the operating position of FIGS. 1 and 2 wheel 45 is held by a telescoping link 46 comprising a sleeve portion 47 pivotally connected at 48 to a lug 49 affixed to the rear end of beam 13, and a rod 50 slidable in sleeve 47, the forward end of which is pivotally connected to an arm 51 affixed to spindle 44.

Bar 32, which transmits draft to the rear portion of forward unit 10 by its operative pivotal connection thereto, is also pivotally connected, as best shown in FIG. 4, to a telescoping draft link 52 comprising a shaft portion 53 pivotally connected to draft bar 32 and adjustably provided with a plurality of openings 54. The rear end of rod 53 is slidable in a sleeve 55, the rear end of which is pivoted to a lug 56 affixed to the side of beam 12.

Draft link 52 is shown in its fully extended position in FIGS. 1 and 2. When the tractor is turned to the left, for example, as at the end of a field, the units 10 and 11 assume the relatively angled positions shown in FIG. 3. Link 46 extends, allowing wheel 45 to caster about the axis of spindle 44 and rod 53 slides inwardly with respect to sleeve 55 of draft link 52.

Relative pivoting laterally of unit 10 with respect to unit 11 is about the axis of universal pivot 40 between the units, and vertical movement of the rear unit with respect to the forward unit to accommodate the implement to variations in ground contour occurs by virtue of the pivots 37, 38 and 40, as indicated diagrammatically in FIG. 4.

Although the implement of this invention has been shown diagrammatically and many of the constructional details of the duplex disk tiller of this invention have been omitted for clarity, the construction and operation thereof should be clearly understood from the foregoing description. It should likewise be understood that the invention has been described in its preferred embodiment and that modifications may be made therein without departing from the spirit of the invention or the scope of the appended claims.

What is claimed is:

1. In a duplex agricultural implement adapted for connection to a tractor, a pair of elongated diagonally extending earthworking units disposed end to end, a front furrow wheel supporting the forward end of the forward unit, a rear furrow wheel and a land wheel supporting the rear end of the rear unit, a transverse truck having laterally spaced wheels, said truck being mounted on and supporting the rear end of the forward unit, an intermediate wheel mounted on and supporting the forward end of said rear unit and disposed between the wheels of said truck, link means pivotally connecting said rear unit to said forward unit in offset parallel relation, the pivotal connection of said units accommodating lateral swinging of one of said units relative to the other to facilitate turning the implement, and hitch means provided for the implement including draft linkage connected to the rear portion of the forward unit and adapted for connection at its forward end to a tractor, and yieldable link means pivotally connected at its forward end to said draft linkage and at its rear end to said rear unit to propel said units in parallel relation during operation and adapted to yield to accommodate angling of the rear unit relative to the forward unit in turning.

2. The invention set forth in claim 1, wherein said intermediate wheel is mounted on said rear unit by vertical pivot means accommodating castering of said intermediate wheel when the implement is turned, said wheel being adapted to engage the furrow wall formed by the forward unit during operation and absorb side thrust.

3. The invention set forth in claim 2, wherein said yieldable link means is a laterally rigid telescoping draft rod.

4. The invention set forth in claim 1, wherein a telescopic link connects said intermediate wheel to the rear of said forward unit and is adapted to hold said wheel against the furrow wall in normal operation and to allow the wheel to caster when the implement is turned.

5. In a duplex agricultural implement adapted for connection to a tractor, a pair of elongated diagonally extending earthworking units disposed end to end, a front furrow wheel supporting the forward end of the forward unit, a rear furrow wheel and a land wheel supporting the rear end of the rear unit, a transverse truck having laterally spaced wheels, said truck being mounted on and supporting the rear end of the forward unit, an intermediate wheel mounted on and supporting the forward end of said rear unit and disposed between the wheels of said truck, and link means pivotally connecting said rear unit to said forward unit in offset parallel relation by means accommodating vertical floating of one of said units relative to the other, the pivotal connection of said units accommodating lateral swinging of one of said units relative to the other to facilitate turning the implement.

References Cited
UNITED STATES PATENTS

| | | | |
|---|---|---|---|
| 1,906,753 | 5/1933 | Johnson | 172—314 X |
| 2,060,196 | 11/1936 | Goodman | 280—411.3 |
| 2,081,083 | 5/1937 | Beebe | 280—411.3 |
| 2,136,550 | 11/1938 | Howard | 172—314 X |
| 2,515,016 | 7/1950 | McClintock | 172—314 X |
| 2,590,158 | 3/1952 | D'Artenay | 172—314 X |
| 2,669,171 | 2/1954 | Silver et al. | 172—578 X |
| 3,066,746 | 12/1962 | Sweet | 172—584 X |
| 3,239,014 | 3/1966 | Derman et al. | 172—314 X |

ROBERT E. PULFREY, Primary Examiner

A. E. KOPECKI, Assistant Examiner

U.S. Cl. X.R.

172—587